June 14, 1927.
C. B. ALLEN
VEHICLE WHEEL
Filed March 28, 1922
1,632,427
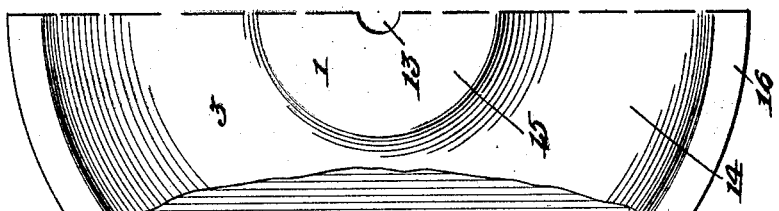
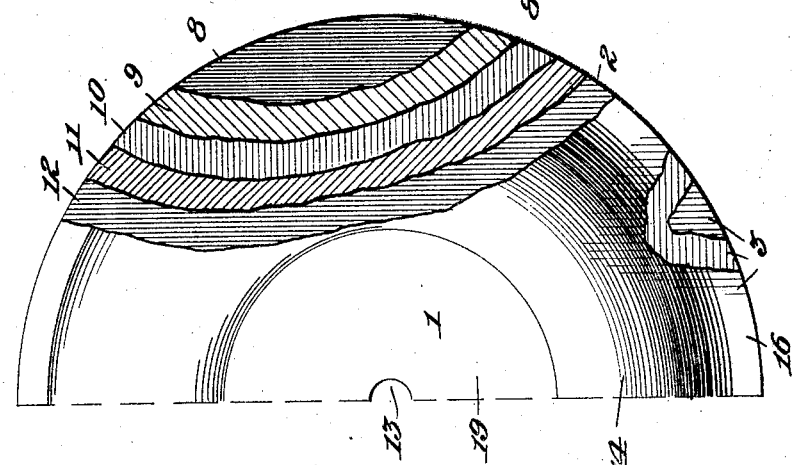
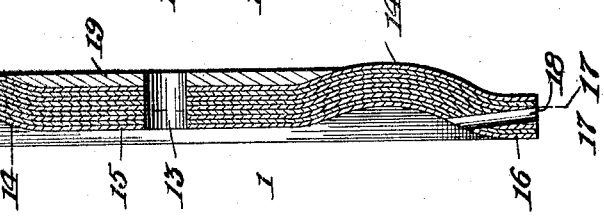
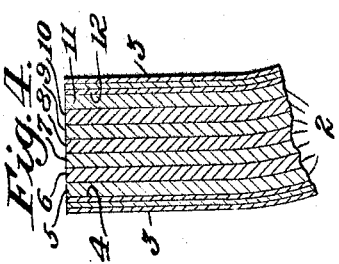
Inventor:
Chester B. Allen,
By Geo. A. Hutchinson
Atty.

Patented June 14, 1927.

1,632,427

UNITED STATES PATENT OFFICE.

CHESTER B. ALLEN, OF MEMPHIS, TENNESSEE, ASSIGNOR OF ONE-HALF TO WILLIAM H. RUSSE, OF MEMPHIS, TENNESSEE.

VEHICLE WHEEL.

Application filed March 28, 1922. Serial No. 547,439.

This invention relates to vehicle wheels, and has for its object to provide an improved form of disk or solid wheel composed of a plurality of layers of wood and formed with a dish which prevents warping and insures true running thereof.

A special object is to provide a dished disk wheel of wood in which the rim is so disposed as to bring the median radial line of the central or hub portion of the disk within said rim so that when a set of wheels are mounted on a vehicle they will track substantially like the ordinary spoked wheels.

Another special object is to form the dished wheel with an annular reversely curved zone between its center and rim and so arranged with respect to the rim that a passage for the inflating nozzle of a pneumatic tire may be formed from the tread of the rim running through the latter and opening on the concave side of said curved zone where convenient access may be had to said nozzle and the same will lie in the plane of the wheel where it is not in danger of being injured.

A further object is to so arrange the layers of wood of which the disk wheel is constructed with their grains running in such relation to one another that the wheel will retain the proper balance of the strains set up in the wood by the pressing of the dish therein, whereby there will be no tendency for the wheel to warp in use. The layers composing the wheel are also cut in a special shape before being assembled for pressing the dish into the same, in order that the proper balance of strains in the wood may be maintained after the marginal portion of the disk is cut off in finishing the wheel.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a broken side view of half of a wheel constructed substantially in accordance with this invention, the layers of wood being broken away to different degrees from the concave side of the dish to the central layer to show the way the grains of said layers run with respect to one another.

Figure 2 is an opposite face view of the same half of the wheel with the layers from that side to the center similarly broken away to show how the grains thereof run with respect to each other and with those of the other side as illustrated in Figure 1, portions of the outside thinner layers being also broken away to show the way the grains thereof run relative to each other.

Figure 3 is a section of the wheel taken diametrically and showing a reinforcing block on the convex side of the dish, and also a passage in the rim portion for the inflating nozzle of a pneumatic tire, and Figure 4 is an enlarged section of the marginal or rim portion of the wheel to show the several layers of wood of which it is composed.

The wheel 1 is formed of a plurality of layers or veneers of wood which are secured together preferably by waterproof glue or cement and are arranged so that the grains of the wood of adjacent layers run in different directions. The number of the layers used may be varied, as well as the thickness of the layers, but as shown in the drawings the wheel is composed of thirteen layers or veneers. The seven intermediate layers 2 are preferably of equal thickness, while the three outside layers 3 on each side of the wheel are thinner than said intermediate layers and preferably of such thickness that the total thickness of said three outside layers substantially equals the thickness of each of the intermediate layers.

The preferred method of constructing the wheel consists in first securing the three layers constituting the outside members 3 together with water-proof glue or cement, said three layers of wood being arranged so that the grains thereof run at right angles to one another as indicated by the broken portion at the bottom of Figure 2. If said three-ply outside members 3 are used at once or in a short time after being cemented together, they will contain enough moisture from the glue or cement to prevent them from checking or cracking in the press used for dishing the wheel, but if said outside members have become dried out before use, they should be moistened before being assembled with the intermediate layers and placed in the press for forming the dish. The intermediate layers 2 do not have to be moistened because if they do check or crack during the pressing operation they are covered by the three-ply outside layers or members 3 which have the necessary moisture to prevent them from cracking.

There should preferably be an odd number of intermediate layers 2 used, and they are assembled or placed together face to face with the grains of the wood of adjacent layers running in different directions. Where seven intermediate layers 2 are used, as illustrated in the drawings, one of the three-ply outside members 3 is laid down first with its upper layer or veneer arranged with its grain running vertically, as at 4, Figure 1. The first intermediate layer 2 is then laid upon said outside member with its grain running at 45° degrees to that of the said outside member's upper or inside layer, as at 5 in Figure 1. The next intermediate layer 2 is then laid with its grain running at 90 degrees to that of the inside layer of the outside member, as at 6 in Figure 1, after which the next intermediate layer is laid in order with its grain running at 45 degrees to the next lower layer and at 135 degrees to the inside layer 4 of the first laid outside member, as shown at 7 in Figure 1. The middle intermediate layer is then laid, as at 8 in Figures 1 and 2, with its grain running vertically, after which the next three intermediate layers are laid in the same relation as the first three, 5, 6 and 7, but in the reverse order, as shown at 9, 10 and 11 in Figure 2, the top outside member 3 being finally placed with its inner layer having its grain running vertically, as at 12 in Figure 2. It will thus be seen that the several layers used in making up the wheel are placed in such a way with relation to the running of the grains of the wood thereof that said grains are disposed in a reverse spiral order from one side of the wheel to the other, and that each two layers which are arranged the same distance from the central layer have the grain running in the same direction. It has been found by long experience that this reverse spiral order of arranging the grains of the layers prevents the wheel from warping because it gives the proper balance to the strains or stresses set up in the wood when the dish is pressed into the disk, whereas if said layers are arranged in a continuous spiral from one side to the other of the wheel a slipping action in the nature of a corkscrew movement between the layers is apt to take place which destroys the proper balance of the stresses or strains in the wood with the result that the wheel will warp.

Long experience has also shown that in order to maintain the proper balance of the strains in the wood after the wheel is finished by the removal of the marginal portion thereof in trimming to size, it is important that the layers be circular in form before being assembled, and that said layers be placed together concentrically, so that the distance from the center to the periphery of each layer will be the same all around. Heretofore angular pieces have been used in building up the layers and it has been found that when the irregular projections around the edge of the wheel are cut off after the dish is pressed in, the removal of greater extents of the grain at some points than at others destroys the balance between the strains which have been set up and balanced during said pressing operation. To insure the proper centering of the assembled layers in the press a central bore 13 is preferably formed in the disk to fit over a pin in the press (not shown). When the several layers are assembled water-proof glue or cement is placed between them, and the disk is left in the press after the dish has been formed until said glue or cement has set, so that when it is removed the wheel cannot return to its original flat form, or warp or buckle, because in order to do so the individual layers of wood must slip on each other, which is prevented by the set glue or adhesive substance between them.

The form and extent of the dish in the wheel may be varied to suit different requirements or tastes, but as shown best in Figure 3 of the drawings the dish includes an annular reversely curved zone 14 between the center and rim so that the median radial line of the central portion or hub 15 will fall within the tread of the rim 16, as indicated by the broken line 17 in said figure. Said central portion 15 is preferably made flat, as shown, and the rim 16 is also made flat so that it lies in a plane parallel to that of the central portion. The rim on the concave side of the dish, however, is preferably pressed outward slightly beyond the plane of the central portion 15 when the dish is formed. By forming the dish with the annular reversely curved zone 14 it is possible to provide a passage 18 through the rim from the tread thereof to the concave side of the dish for receiving the inflating nozzle of a pneumatic tire (not shown), so that the wheel may be used with stock rims and tires and the nozzle will lie in the concave of the dish where it is not apt to be injured when the wheel is running.

The central portion of the wheel may be reinforced by the addition of a circular block of wood 19, Figure 3, which is suitably secured on the convex side of the dish so as to cover the central flat portion 15 and the adjacent portions of the dish. Other modifications may be made in the construction herein shown and described without departing from the present invention. It will be noted that the formation of the wheel with a dish not only insures its running true but also adds greatly to its rigidity and strength. It should be noted further that the number of the thinner layers making up the outside members 3 of the wheel may be varied, two being sufficient. The grains of these layers are arranged preferably at right angles to each other whether two or more of them are used.

I claim:—

1. A dished wooden disk for vehicle wheels having a flat central portion and an annular reversely curved zone surrounding said central portion, there being a block secured to the wheel on the convex side of the dish, said block fitting over the central flat portion of the wheel and the adjacent portions of said curved zone.

2. A dished wooden disk for vehicle wheels having a flat central portion and an annular reversely curved zone surrounding said central portion, there being a block secured to the central portion of the wheel on the convex side of the dish and fitting the adjacent portions of said curved zone, and the rim of said wheel being disposed so that the median radial line of the central portion falls within said rim.

3. A dished wooden disk for vehicle wheels having a flat central portion and an annular reversely curved zone surrounding said central portion, there being a block fitting over the central portion and adjacent portions of said curved zone on the convex side of the dish, the rim of the wheel being flat and disposed in a plane parallel to that of said central portion, and said rim being also disposed so that the median radial line of the central portion falls therein.

4. A dished disk for vehicle wheels composed of a plurality of layers of wood secured together, the grains of the several layers being spirally arranged at different angles from the outside to the center and the layers at equal distances from the center having their grains running in the same direction.

5. A dished disk for vehicle wheels composed of a plurality of layers of wood secured together and arranged with their grains running at different angles in a reverse spiral order from side to side of the wheel.

6. A dished disk for vehicle wheels composed of a plurality of layers of wood secured together and arranged with their grains running at different angles in a reverse spiral order from side to side of the wheel, there being a plurality of outside layers on each side of the wheel which are thinner than the intermediate layers.

7. A dished disk for vehicle wheels composed of a plurality of layers of wood secured together and arranged with their grains running at different angles in a reverse spiral order from side to side of the wheel, there being a plurality of outside layers on each side of the wheel which are thinner than the intermediate layers, and the grains of adjacent ones of said outside thinner layers being arranged at right angles to one another.

8. A dished disk for vehicle wheels composed of a plurality of intermediate layers of wood secured together and arranged with their grains running at different angles in a reverse spiral order from side to side of the wheel, and a plurality of outside layers on each side of the wheel which are thinner than the intermediate layers, the grains of the inner ones of said outer thinner layers running in the same relative order as those of said intermediate layers.

9. A dished disk for vehicle wheels composed of a plurality of intermediate layers of wood secured together and arranged with their grains running at different angles in a reverse spiral order from side to side of the wheel, and a plurality of outside layers on each side of the wheel which are thinner than the intermediate layers, the grains of adjacent layers on the outside being arranged at right angles to one another, and the grains of the inner ones of said outside thinner layers running in the same relative order as those of said intermediate layers.

10. A dished disk for vehicle wheels composed of a plurality of layers of wood secured together and arranged with the grains of adjacent layers running in different directions, the grains of the outside layers and middle layer running in the same direction, and the other layers at equal distances from said middle layer also running in the same direction.

11. A disk for vehicle wheels comprising a plurality of layers of wood with their adjacent faces securely adhered together to form a solid structure, said disk having an annular uniformly curved depression in its face, substantially as set forth.

12. A wooden disk for vehicle wheels formed of a permanent fixed shape and comprising substantially flat central and rim portions and having a uniformly curved portion joining said central and rim portions, substantially as set forth.

13. A wooden disk for vehicle wheels formed of a permanent fixed shape and comprising a substantially flat central portion and a substantially flat rim portion and having a uniformly curved portion joining said central and rim portions said rim portion having a substantially cylindrical periphery, substantially as set forth.

14. A dished wooden disk for vehicle wheels formed of a permanent fixed shape and comprising a substantially flat central portion and a substantially flat rim portion and having a curved portion in the form of a section of a torus taken transversely to the axis thereof joining said central and rim portions, substantially as set forth.

15. A dished wooden disk for vehicle wheels having an annular uniformly curved portion between its center and rim and a block secured to the wheel and fitting against the central portion thereof, substantially as set forth.

16. A wooden disk for vehicle wheels composed of laminated wood and formed with a flat central portion and a flat portion adjacent to its rim, with a curved portion between, and an aperture leading from a point within said curved portion on the outer face of the disk through the rim to form a passage for a tire valve, substantially as set forth.

17. A disk for vehicle wheels having a flat central portion and an annular convex portion on one side thereof, and a smaller disk on said wheel having its edge tapered to conform to the contour of said convex portion, substantially as set forth.

18. A wooden disk for vehicle wheels made up of a plurality of layers of wood secured together by an adhesive to form a solid structure, said disk being formed with a flat central portion and a flat rim portion with a curved depression between said rim portion and said central portion, substantially as set forth.

19. A laminated wooden disk for vehicle wheels having a flat central portion in a plane parallel to but offset from the plane of the rim, and a smaller disk against said flat central offset portion, substantially as set forth.

20. A laminated disk for vehicle wheels comprising a central layer of wood and a plurality of layers of wood secured thereto on each side thereof, the grains of adjoining layers being angularly disposed and the grains of the layers at equal distances from said central layer being similarly disposed, substantially as set forth.

In testimony whereof I have signed my name to this specification.

CHESTER B. ALLEN.